United States Patent

Westlin et al.

[15] 3,668,843
[45] June 13, 1972

[54] FILTER SUPPORT CONSTRUCTION

[72] Inventors: Karl L. Westlin; Allan R. Getzin, both of Louisville, Ky.

[73] Assignee: American Air Filter Company, Inc., Louisville, Ky.

[22] Filed: April 6, 1970

[21] Appl. No.: 25,929

[52] U.S. Cl. ................................. 55/501, 55/507, 55/511
[51] Int. Cl. ............................................... B01d 25/22
[58] Field of Search ............... 55/341, 372, 378, 379, 483, 55/484, 491, 493, 501, 504, 505–507, 508, 511; 160/376

[56] References Cited

UNITED STATES PATENTS

| 487,656 | 12/1892 | Way | 160/376 |
| 3,247,652 | 4/1966 | Annas et al. | 55/484 |
| 3,309,848 | 3/1967 | Schwab | 55/484 |
| 3,394,534 | 7/1968 | Andrews et al. | 55/484 |
| 3,418,794 | 12/1968 | Roberts | 55/509 |
| 3,500,618 | 3/1970 | Sokol | 55/484 |
| 3,541,767 | 11/1970 | Getzin et al. | 55/378 |

*Primary Examiner*—Bernard Nozick
*Attorney*—Ralph B. Brick and Charles G. Lamb

[57] ABSTRACT

Gas filter apparatus including a flow-through filter support frame having opposed channels to receive a filter cell header frame and means cooperating with opposed sides of the filter cell header frame to resiliently urge the header frame into sealing engagement in the support channels.

3 Claims, 3 Drawing Figures

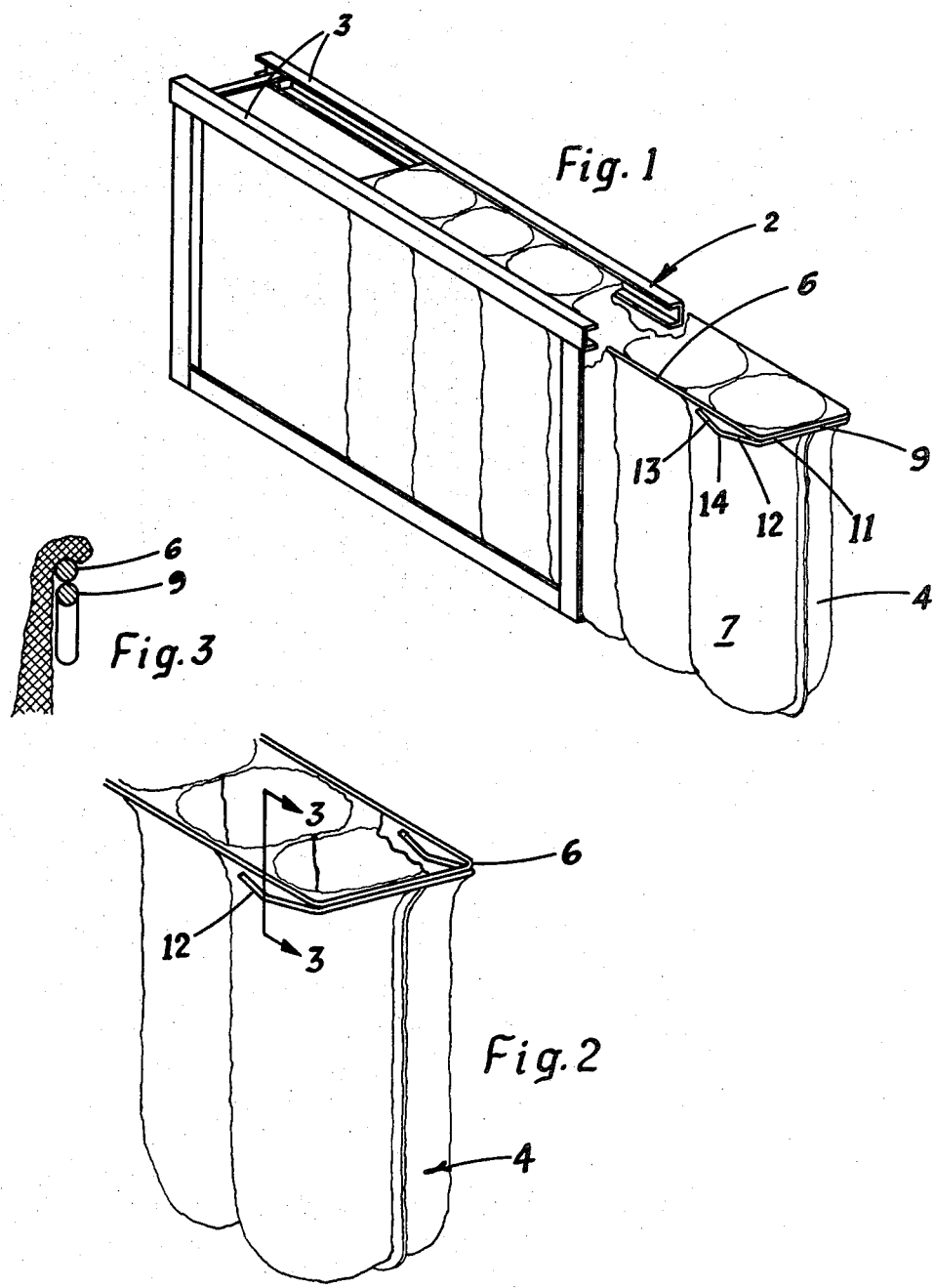

FILTER SUPPORT CONSTRUCTION

BACKGROUND OF THE INVENTION

The present invention pertains to the fluid filtration art and finds particular utility in the gas separation art wherein particulate materials are separated from a gaseous stream.

Various arrangements are known in the art of gas filtration for supporting a unit filter cell in a support housing. Although these past arrangements have attempted to provide for ready installation and removal of a unit filter cell in a support housing, at the same time accomplishing efficient sealing, these arrangements have proven to be complex and expensive in construction and assembly and have not always provided the desired sealing to insure that the gaseous stream to be treated passes through the filter media and not around the support structure.

SUMMARY OF THE INVENTION

The present invention, recognizing that past arrangements have presented problems in construction, assembly, sealing, wear and gas stream obstruction, provides a filter cell support and retaining assembly which is straightforward and economical to manufacture and install, occupying a minimum of space and requiring a minimum of steps for insertion and removal of a filter cell. In addition, the apparatus of the present invention readily accommodates for variations which might occur in manufacture to obtain a substantially positive, uniformly applied pressure against the filter cell header frame, avoiding pressure overload and cell wearing sliding friction.

Various other features of the present invention will become obvious to one skilled in the art upon reading the disclosure set forth hereinafter.

More particularly, the present invention provides a gas filter apparatus comprising: a flow-through support frame; spaced opposed channel members of U-shaped cross section mounted to and extending transversely across the support frame, the channel members being opened at one end thereof to slidably receive a filter cell header frame therein; a filter cell including a rectangular flow-through header with a filter media member having its peripheral edges fastened to the header frame, the header frame being so sized that opposed sides thereof slidably engage in the opposed channel members of the support frame; and, longitudinally extending spring members cooperating with the opposed sides of the header frame to uniformly and constantly urge the opposed sides of the header frame into sealing engagement against the inner walls of the opposed channel members of the support frame.

It is to be understood that various changes can be made in the arrangement, form, and construction of the apparatus disclosed herein by one skilled in the art without departing from the scope or spirit of the present invention.

Referring to the drawing which discloses one advantageous embodiment of the present invention;

FIG. 1 is an isometric partially broken away view of the novel filter cell and support frame arrangement;

FIG. 2 is an enlarged partial isometric view of the filter cell of FIG. 1; and

FIG. 3 is an enlarged cross sectional view taken in a plane passing through line 3—3 of FIG. 2.

Referring to FIG. 1 of the drawing, flow-through support frame 2 in the form of a rectangular skeletal housing is disclosed. Frame 2 includes at one side thereof a pair of longitudinally extending, spaced opposed channel members 3 of U-shaped cross-section mounted to extend transversely across the support frame on either side of the gas stream to be treated.

Channel members 3 are opened at one end thereof to slidably receive and support a novel filter cell 4 of the present invention in a manner described hereinafter. It is to be understood that this skeletal housing as disclosed can be incorporated in a further enclosed housing (not shown) or such enclosed housing itself can serve as the support frame for the filter cell.

Referring to FIG. 2 of the drawing, the novel filter cell 4 includes a rectangular flow-through header frame 6 having a filter media member in the form of a pleated filter bag 7 attached thereto. Filter bag 7 can be fabricated from some suitable filter material such as fiberglas in a form known in the art. In accordance with the present invention, the filter bag 7 has its peripheral edges fastened to header frame 6 in such a manner that the filter media edges overlap and cover the face of the header frame (FIG. 2). It is to be understood that the present invention is not to be considered as limited to the filter configuration disclosed but that other filter media shapes can be used.

Header frame 6 is so sized that opposed sides thereof slidably engage in opposed channel members 3 of support frame 2.

Fastened to header frame 2 are opposed flexible rod members 9 each having a U-shaped configuration to include base leg 11 and parallel side legs 12 with the base leg 11 being coextensive with and fastened to a side of header frame 6 intermediate the sides which slidably engage in channel members 3 of the support frame. The side legs 12 of rod member 9 are so arranged as to be coextensive with the channel engaging sides of header frame 6. Each side leg includes a floating end portion 13 bent as at 14 at an angle to resiliently engage against one inner wall of a channel member when header frame 6 is inserted therein to thus urge the header frame side against the opposite inner wall of a channel member insuring a firm sealing relationship, the overlapped filter media of filter bag 7 serving as an intermediate sealing member between the header frame and the inner wall of the channel.

In accordance with the present invention, it will be obvious that by merely sliding the header frame and filter media assembly into the support channels, the resilient legs engage in the channels urging the frame into sealing engagement against the inner walls of the channels. Equally, the header frame can be rapidly removed in a simple straightforward operation for replacement of the filter media.

What is claimed is:

1. Gas filter apparatus comprising: a flow-through support frame defining a gas passageway; spaced opposed channel members of U-shaped cross-section mounted to said support frame and extending transversely across said gas passageway, said channel members being opened at one end; a filter cell including a rectangular flow-through header frame slidably received between said channel members through said open end with a filter media member having its peripheral edges fastened to said header frame, said header frame being so sized that opposed sides thereof slidably engage in said opposed channel members of said support frame; and longitudinally extending spring members attached to and cooperating with said opposed sides of said header frame to uniformly and constantly urge each of said opposed sides of the header frame toward sealing engagement against the corresponding inner wall of said opposed channel members of said support frame to seal the peripheral edges of the filter media member about the opening of the support frame.

2. The apparatus of claim 1, said spring members comprising spaced, opposed flexible U-shaped rod members, each including a base leg and parallel side legs with said base leg being coextensive with and fastened to a side of said header frame intermediate the sides which slidably engage in said channel members of said support frame, said side legs being coextensive with said channel engaging sides of said header frame, each side leg including a floating end portion bent at an angle to resiliently engage against one inner wall of said channel member to urge said header frame side toward the opposite inner wall of said channel member.

3. The apparatus of claim 1, said filter media member having its peripheral edges overlapping that face of said header frame urged toward sealing engagement against said inner walls of said channel members to serve as an intermediate sealing member therebetween.

* * * * *